Oct. 1, 1940.    C. A. GUSTAFSON    2,216,314
ROAD MACHINE
Filed Dec. 20, 1938    3 Sheets-Sheet 1
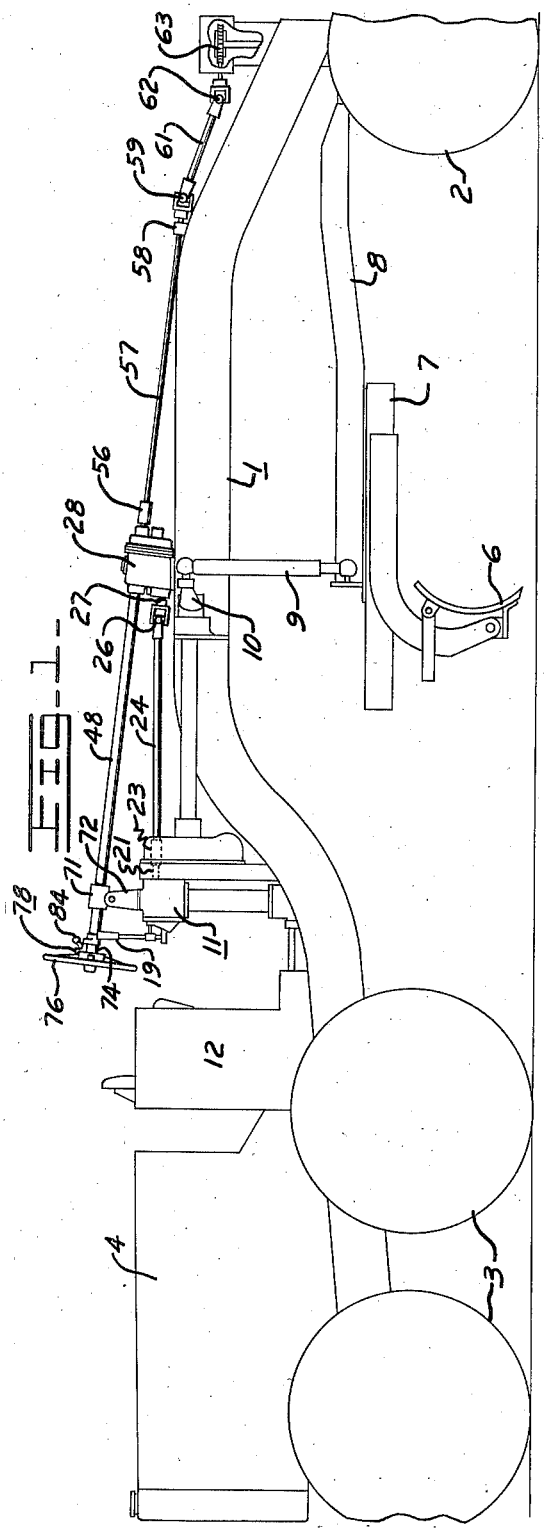
INVENTOR.
CARL A. GUSTAFSON
BY Charles W. Fryer
ATTORNEY.

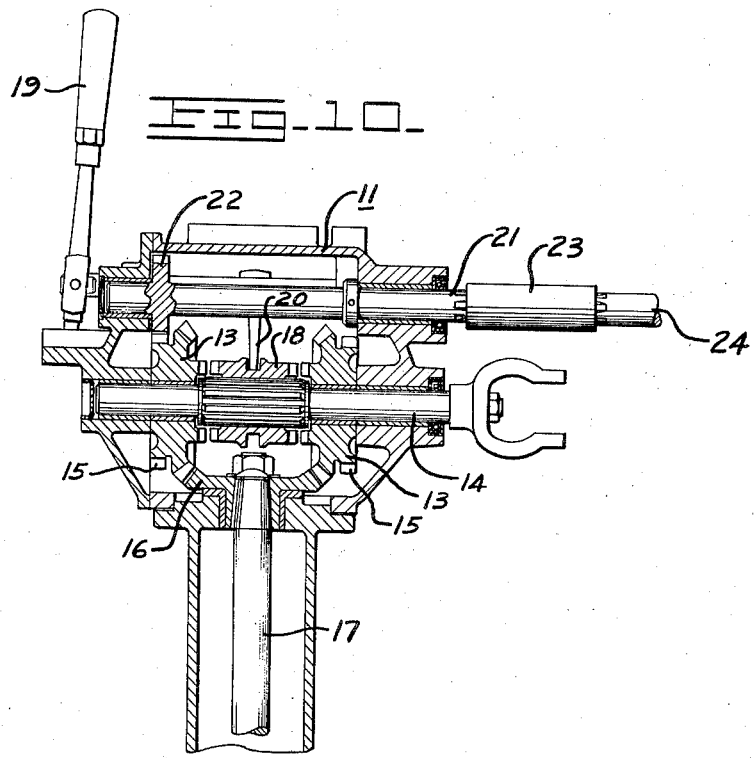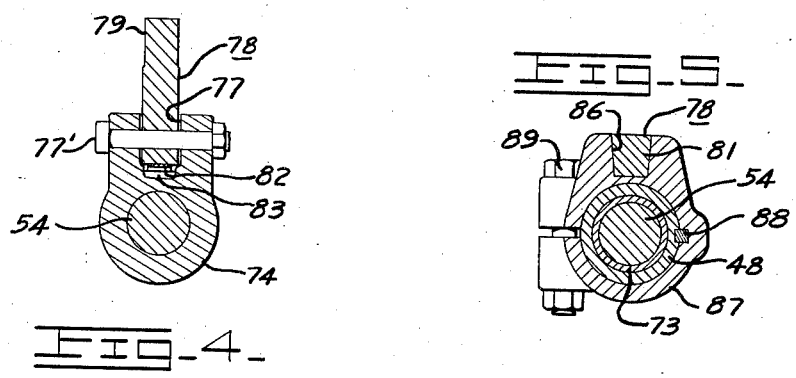

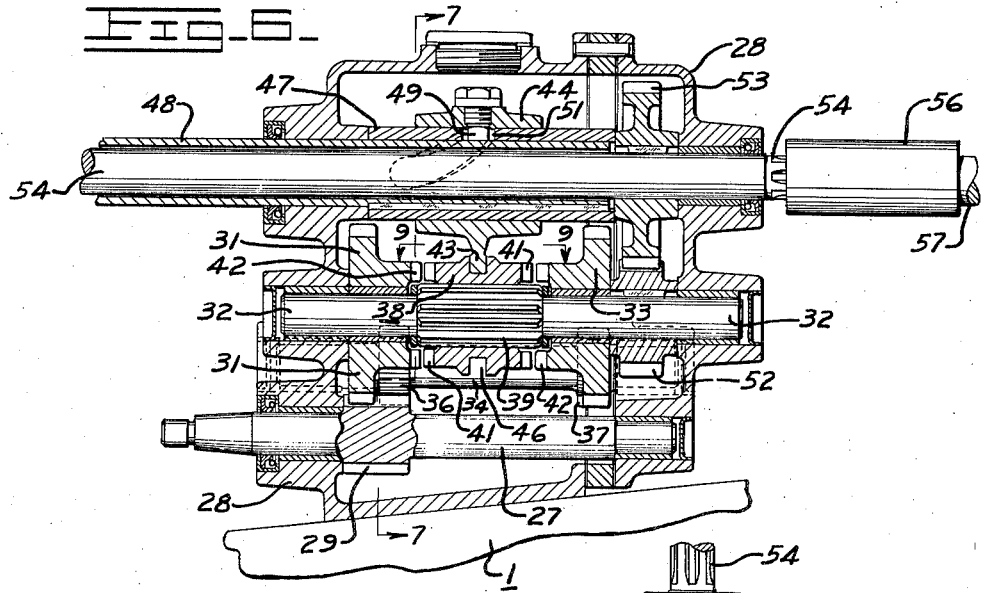

Patented Oct. 1, 1940

2,216,314

UNITED STATES PATENT OFFICE 2,216,314

ROAD MACHINE

Carl A. Gustafson, Peoria, Ill., assignor to Caterpillar Tractor Co., San Leandro, Calif., a corporation of California Application December 20, 1938, Serial No. 246,818

6 Claims. (Cl. 180—79.3)

My invention relates to road machines, and more particularly to power steering mechanism having special applicability to road graders of the self-propelled type.

Self-propelled graders are usually provided with front steering wheels and rear driving wheels; the machine being generally manually steered by manipulation of a manually controllable steering wheel connected through suitable steering mechanism to the front steering wheels. If the gear reduction in the steering mechanism is relatively low to enable short turning of the steering wheel to thus make steering quickly responsive to turning of the steering wheel, road shocks continuously cause the front wheels to deviate from a true course and the operator has to continuously steer the machine to maintain it on a proper course in order that the earth working means, such as the grader blade underneath the machine, may follow a true path. The operator of the machine, during working thereof, usually has to manipulate the usual earth working adjusting means on a machine of this character; and if he has to steer the machine at the same time, this may interfere with his operation of the earth working adjusting means. Should the gear reduction in the steering mechanism be relatively high to preclude road shocks from causing the machine to deviate from a straight course, the above described difficulty is overcome, but steering requires more time and is more tedious because the steering wheel has to be turned more. Furthermore, even when the gear reduction is such as to enable steering by short turning of the steering wheel, the steering becomes tedious when the machine is doing heavy duty work and traveling at a slow speed, and this may impair the operator's efficiency in adjusting the earth working means.

My invention is designed to obviate the above described difficulties and has as its objects, among others, the provision of improved steering control means, particularly adapted for a self-propelled grader, which is designed to provide power steering for the usual steerable supporting means of such grader; which also allows manual steering when so desired; which is so constructed as to permit both power steering and manual steering by manipulation of the same control member which is, preferably, in the form of the customary steering wheel; which, when power steering is employed to steer the machine, will not cause spinning of the control member and thereby possibly injure the operator; and which is of simple and economical construction, and easy to operate.

Other objects of the invention will become apparent from a perusal of the following description thereof.

In general, the steering apparatus of my invention comprises selectively operable drive establishing mechanism which receives its power from the usual power plant or engine of the road machine, and which may be connected to rotate in either direction, a steering rod or shaft forming part of the steering mechanism or gear of the machine. Control of the drive establishing mechanism is selectively effected by turning in either direction a manually operable steering wheel; a simple clutch mechanism being provided to connect such control means with the drive establishing mechanism when so desired. Means is provided to connect the steering wheel directly to the steering mechanism when it is desired to steer the machine manually; and when so connected, the drive establishing mechanism has no driving effect or influence on the steering wheel. Also, the drive establishing mechanism is so constructed that when connected to the steering mechanism for power steering, power is not transmitted to the steering wheel to drive the same, thereby precluding spinning thereof which might injure the operator.

Reference will now be made to the drawings for a more detailed description of the invention in which:

Fig. 1 is a more or less schematic side elevation of a self-propelled road grader equipped with the steering apparatus of my invention.

Fig. 2 is a fragmentary longitudinal sectional view, partly in elevation, illustrating the means for clutching the steering wheel for either manual or power steering.

Fig. 3 is a plan view of the structure shown in Fig. 2, looking in a direction of line 3—3 in Fig. 2.

Fig. 4 is a vertical section taken in the plane indicated by line 4—4 in Fig. 2.

Fig. 5 is a vertical section, taken in the plane indicated by line 5—5 in Fig. 2.

Fig. 6 is a longitudinal vertical sectional view through the power operable drive establishing mechanism of my invention, taken in planes indicated by line 6—6 in Fig. 7.

Fig. 7 is a transverse vertical sectional view taken in planes indicated by line 7—7 in Fig. 6.

Fig. 8 is a horizontal sectional view, partly in elevation, taken in a plane indicated by line 8—8 in Fig. 7.

Fig. 9 is a fragmentary sectional, plan view of a portion of the mechanism illustrated in Fig. 6, taken in a plane indicated by line 9—9 in Fig. 6.

Fig. 10 is a vertical sectional view through the main power control box on the grader, through which adjustable earth working means on the machine may be adjusted.

For the purposes of illustration, I have chosen a self-propelled grader of the type generally similar to that disclosed in my prior Patent No. 2,034,141, dated March 17, 1936, although my invention is applicable to any similar type of machine. Such grader comprises grader frame 1 mounted on front dirigible steering wheels 2 steerable through any suitable steering gear or mechanism, and on rear tandem drive wheels 3 driven from the engine 4. Grader blade 6 is mounted for angular adjustment, on the usual rotatably mounted circle mechanism 7 supported on drawbar mechanism 8 which has a universal front draft connection (not shown) at the front of grader frame 1, and which is suspended at its rear from the grader frame 1 by means of adjustable lift links 9, connected to rotatable crank arms 10 by which either end of blade 6 may be adjusted vertically. By such means, the usual adjustments provided in graders may be imparted to the earth working grader blade 6.

The adjustments in the machine chosen for purposes of illustration are preferably power controlled by suitable clutch mechanism drivable from the engine and otherwise of the type described in my aforementioned patent. As I preferably derive power from the engine through such clutch mechanism for the power steering, a brief description of such clutch mechanism is made herein. The clutch mechanism comprises a plurality of reversibly operable clutch assemblies grouped within a common housing 11, located adjacent the operator's station 12 of the machine. One of such assemblies is illustrated in Fig. 10 and comprises oppositely positioned bevel gears 13 journaled about shaft 14 journaled in housing 11; each of gears 13 having integral therewith a spur gear 15. The bevel gears 13 mesh with a bevel gear 16 secured to upright shaft 17 which is continuously power driven from the engine, in the manner illustrated in my previously mentioned patent. It is thus seen that bevel gears 13 are continuously rotated in opposite directions; and by means of a clutch element 18, splined for rotation with shaft 14 and axially shiftable to engage either gear 13 by proper manipulation of control handle 19 connected to clutch control fork 20 which engages clutch element 18, shaft 14 may be selectively rotated in either one of opposite directions when so desired, to effect adjustment of the mechanism which may be connected to such shaft 14. The spur gears 15 mesh with similar spur gears journaled about a shaft forming part of an adjacent clutch assembly, to thus provide a plurality of adjusting mechanisms, as is disclosed in my patent.

As previously mentioned, I utilize the continuous power imparted to the clutch control mechanism for the power steering. This is obtained by shaft 21 journaled in housing 11, and continuously driven from the left-hand continuously driven bevel gear 13 appearing in Fig. 10 by means of the spur gear 15 integral with bevel gear 13, and which also engages a spur gear 22 integral with shaft 21.

Means is provided for transmitting continuous power from continuously rotated shaft 21, to the selectively operable power steering drive establishing mechanism adapted for connection to the steering gear or mechanism. With reference to Figs. 1, 6 and 10, shaft 21 is connected by sleeve 23 to shaft 24 which has a universal connection 26 with a shaft 27 journaled in the lower part of drive establishing or clutch housing 28 mounted on grader frame 1. Shaft 27 has formed integral therewith a wide pinion 29 which engages and continuously rotates in one direction a gear 31 which is journaled on a shaft 32 for rotation about such shaft; shaft 32 being journaled for rotation in housing 28. A second gear 33 spaced from gear 31 is also journaled on shaft 32 for rotation about the shaft, and is driven continuously in a direction opposite to gear 31, by means of reverse gearing journaled in the housing 28 and which includes shaft 34 having at one end thereof gear 36 engaging pinion 29 and at the opposite end gear 37 engaging gear 33.

It is to be noted that gears 31 and 33, although continuously rotated in opposite directions, do not by such rotation drive shaft 32. Control means is provided to connect either of gears 31 or 33 to shaft 32, to thus cause such shaft to be rotated in either one of opposite directions for driving the steering mechanism in either one of opposite directions. A clutch element 38 rotatable with shaft 32 and axially shiftable in either direction along such shaft, by virtue of the splined connection 39, is provided at each end with beveled clutch teeth 41 (Fig. 9) adapted to engage complementary clutch teeth 42 on gears 31 and 33. When such clutch element 38 is shifted so as to be clutched to gear 31, shaft 32 will be rotated in one direction; and when the clutch element 38 is connected to gear 33, shaft 32 will be rotated in the opposite direction. Axial shifting of clutch element 38 is effected by means of fork 43 integral with sleeve 44 and engaging in a groove 46 formed in clutch element 38; sleeve 44 being loosely mounted about a sleeve 47 keyed so as to be secured for rotation with elongated tubular member or sleeve 48 which may be turned in either direction by a steering control wheel, in a manner to be subsequently described.

A pin 49, fixedly secured to sleeve 44, engages a helical slot 51 formed in the sleeve 47 which is keyed to sleeve 48. By such engagement of pin 49 in helical slot 51, sleeve 44 may be made to travel in either one of opposite axial directions, depending upon the direction of turning of elongated sleeve 48, to thus cause clutch element 38 to be shifted in either one of selected opposite directions, and thereby cause shaft 32 to be rotated in either one of opposite directions.

Shaft 32 is connected to steer the front steering wheels 2 of the machine when operated in the selected direction through the described drive establishing mechanism, by means of pinion 52, secured for rotation with shaft 32 and engaging a gear 53 secured for rotation with elongated shaft 54 which extends completely through the elongated sleeve 48 and through housing 28. At its forward end, shaft 54 is connected, by means including sleeve member 56, to shaft 57 journaled in a suitable bracket 58 on the main frame 1 of the machine; shaft 57 forming part of the steering mechanism and being connected by universal connection 59 to a shaft 61 in turn connected through universal connection 62 to the remainder of the steering mechanism for the steering wheels 2, which may be of any conventional or suitable construction and generally includes worm and worm wheel connection 63.

From the preceding description, it is seen that when clutch element 38 is in neutral position, power steering does not occur, but when clutch element 38 is shifted to engage either of gears 31 or 33, the front steering wheels 2 may be turned in either direction depending upon the direction of shifting of clutch element 38. In this connection, shaft 17 is continuously rotated in such direction, that when the steering control means including sleeve 48 is turned to the right or left, the steering wheels will be turned to the right or left, respectively. By virtue of the beveled character of clutch teeth 41 and 42, there is no danger of injuring the mechanism should the operator cause the steering wheels to be turned to the maximum extent, and still have the drive establishing mechanism in engagement, because such clutch teeth provide a camming action which causes the clutch teeth to disengage automatically.

Means is provided in housing 28 to maintain resiliently the clutch element 38 in neutral position comprising laterally extending ears 64 on sleeve 44, each of which is provided with an aperture 66 adjacent its end. A rod 67, fixedly secured in housing 28, extends through each aperture 66 in ear 64; and a spring 68 is interposed between each side of each ear 64 and the adjacent side of housing 28. Thus, when elongated sleeve 48 is turned to effect shifting of clutch element 38, and subsequently released, the resilient means 68 will restore the mechanism including the sleeve 48, to neutral position. At the same time, since ears 64 engage the fixed rod 67, only axial movement will be imparted to sleeve 44 when sleeve 48 is turned, to provide the results previously discussed.

Means is provided in the form of a hand operated steering wheel to effect turning of sleeve 48 to actuate the power steering drive establishing mechanism, in the manner described, and also to permit optional manual steering by direct turning of shaft 54, when so desired. With particular reference to Figs. 1, 2 and 3, sleeve 48 extends to the operators' station 12 of the machine, and is journaled adjacent its rear end in a suitable bearing 71 pivotally mounted on bracket 72 supported on clutch housing 11. Elongated shaft 54, which extends all the way through sleeve 48, is journaled adjacent its rear end in a suitable bearing 73 in sleeve 48, and projects beyond the rear end of the sleeve to the operator's station. Hub 74 of manually controllable steering wheel 76 is journaled for free rotation about the projecting end of shaft 54, and is formed with a longitudinally extending slot 77, in which is pivotally mounted on a bolt 77', an L-shaped latching member or clutch element 78 having a latching tooth 79 at one end thereof and another latching tooth 81 at its opposite end.

Latching member 78 is resiliently pressed so that either one of its legs is maintained in a substantially horizontal position for a purpose to be subsequently explained, by means of a flat spring element 82, mounted in a recess 83 in hub 74. A control handle 84 is formed integral with latching member 78 to permit latching tooth 81 to be shifted so as to engage in a recess 86 formed in collar 87 fixedly clamped to the rear end of sleeve 48, to enable such sleeve 48 to be turned in either one of opposite directions by wheel 76. As can be seen from Fig. 5, collar 87 is split, has a keyed connection 88 with sleeve 48, and is also rigidly clamped to the sleeve by means of bolt and nut connection 89, to thus provide a rigid connection with the sleeve. Also, latching member 78 may be shifted by control handle 84 to engage latching tooth 79 in a recess 91 formed in collar 92 rigidly secured to the rear end of shaft 54, by means including key 93 and nut 94. In the latter position of the latching member, manual turning of wheel 76 will effect manual operation of the steering mechanism, through shaft 54. Because of spring element 82, the latching member is securely held in engagement in the particular recess 86 or 91 into which it may have been shifted.

Fig. 2 illustrates manually controllable steering wheel 76 latched to sleeve 48 which forms part of the control mechanism for establishing a selected drive through the drive establishing mechanism in housing 28. In operation of such power steering apparatus, it is only necessary to turn steering wheel 76 a few degrees to the right, or the left, whichever may be desired, and hold it there, to effect corresponding steering of the steerable front wheels 2 in the manner already described. Upon release of steering wheel 76, when the desired power steering is effected, wheel 76 will be immediately restored to neutral position, as well as clutch element 38, by virtue of the resilient means 68. Although shaft 54 is rotated during the power steering, it is to be noted that under such conditions, there is no connection of shaft 54 with wheel 76. Hence no spinning of such wheel, which might cause injury to the operator, can occur. Also, since the power steering control means including wheel 76 and sleeve 44 is not driven when connected to establish a drive through the described drive establishing mechanism but only serves as a control means, no spinning of steering wheel 76 can occur during the power steering. The power steering enables the machine to be steered quickly and easily thus leaving the operator more time for adjustments of the earth working means, and therefore facilitates his work in this respect.

When it is desired to employ hand steering, for example when the machine is traveling at a comparatively high speed and not doing work, latching member 78 may be shifted to cause engagement of wheel 76 with shaft 54, and disengagement from tubular sleeve 48; and in turning the hand wheel 76, it will effect steering in a normal way through shaft 54. In this connection, it is to be observed that when hand steering is employed, shaft 54 will not be driven through the drive establishing mechanism, because sleeve 48 and consequently clutch element 38, being free of connection with wheel 76, will be held in neutral position by resilient means 68, and shaft 32 will not be engaged with either of gears 31 and 33. The provision of the single hand controllable steering wheel 76 for effecting the power steering as well as the hand steering, is desirable because it places no extra burden on the operator; the same manipulations being all that is necessary in both cases.

I, therefore, claim as my invention:

1. A self-propellable vehicle having a source of power; steerable ground engaging supporting means for said vehicle; steering mechanism for said ground engaging supporting means; shafting connected to said steering mechanism and adapted to be rotated in either one of opposite directions to effect steering in either one of opposite directions; drive establishing mechanism for effecting power steering of said steering mechanism in either one of opposite directions comprising a normally stationary shaft connected to said shafting so as to drive the same when it is driven, a pair of gears journaled about said shaft and having beveled clutch teeth on the inner faces thereof, means connected to said source of power for driving said gears in opposite directions, and a clutch element rotatable with and axially shiftable in either direction along said shaft and having beveled clutch teeth adapted to engage said first mentioned clutch teeth to connect either of said gears to said shaft to drive said shaft in either one of opposite directions; and control means for shifting said clutch element.

2. A self-propellable vehicle having a source of power; steerable ground engaging supporting means for said vehicle; steering mechanism for said ground engaging supporting means; shafting connected to said steering mechanism and adapted to be rotated in either one of opposite directions to effect steering in either one of opposite directions; a tubular shaft through which said shafting extends; drive establishing mechanism for effecting power steering of said steering mechanism in either one of opposite directions comprising a normally stationary shaft connected to said shafting so as to drive the same when it is driven, a pair of gears journaled about said shaft, means connected to said source of power for driving said gears in opposite directions, and a clutch element rotatable with and axially shiftable in either direction along said shaft to connect either of said gears to said shaft to drive said shaft in either one of opposite directions; control means for shifting said clutch element including said tubular shaft which is turnable in either one of opposite directions and which extends from said drive establishing mechanism, connecting means between said tubular shaft and said clutch element, and a manually operable steering wheel free of but connectable to said tubular shaft for effecting turning of said tubular shaft; means for optionally enabling manual steering of said steerable steering mechanism including said shafting extending through said tubular shaft and said steering wheel which is also free of but connectable to said shafting; and means for selectively connecting said steering wheel to said shafting or to said tubular shaft.

3. A self-propellable vehicle having a source of power, steerable ground engaging supporting means for said vehicle, steering mechanism for said steerable ground engaging supporting means adapted to be selectively power or manually driven in either one of opposite directions, drive establishing mechanism drivable from said source of power to transmit a selected power drive to said steering mechanism in either one of opposite directions, control means for said drive establishing mechanism including a tubular shaft turnable in either one of opposite directions, a steering wheel journaled about an axis for free rotation, optional control means for manually steering said steering mechanism including shafting extending through said tubular shaft and connected to said steering mechanism, and means for selectively connecting said steering wheel to said shafting or to said tubular shaft.

4. In a self-propellable vehicle, a source of power, steerable ground engaging supporting means for said vehicle, steering mechanism for said steerable ground engaging supporting means adapted to be selectively power or manually driven in either one of opposite directions, drive establishing mechanism drivable from said source of power to transmit a selected power drive to said steering mechanism in either one of opposite directions, a tubular shaft and another shaft extending through said tubular shaft, one of said shafts being connected to said drive establishing mechanism and being turnable in either one of opposite directions to control said drive establishing mechanism and the other shaft being connected to said steering mechanism for manual steering thereof, a steering wheel journaled for free rotation, and means for selectively connecting said steering wheel to either of said shafts.

5. A vehicle having an engine; a member continuously driven by said engine; steering mechanism for said vehicle; drive establishing mechanism for actuating said steering mechanism including a shaft adapted to be rotated in either one of opposite directions to effect steering of said steering mechanism in either one of opposite directions, a pair of gears journaled about said shaft and connected to said continuously driven member for constant rotation in opposite directions, said gears having clutch teeth on the inner faces thereof and a clutch element rotatable with and axially shiftable from a neutral position in either direction along said shaft and having clutch teeth adapted to engage said first mentioned clutch teeth to connect either of said gears to said shaft; control means for shifting said clutch element comprising a member turnable in either one of opposite directions and extending from said drive establishing mechanism, and a manually controllable steering wheel for effecting turning of said turnable member; and means for automatically restoring said clutch element to neutral position when said manually controllable steering wheel is released.

6. A vehicle having an engine; a member continuously driven by said engine; steering mechanism for said vehicle; drive establishing mechanism for actuating said steering mechanism including a shaft connected to said steering mechanism and adapted to be rotated in either one of opposite directions to effect steering of said steering mechanism in either one of opposite directions, a pair of gears journaled about said shaft and connected to said continuously driven member for constant rotation in opposite directions, and a clutch element rotatable with and axially shiftable in either direction along said shaft to connect either of said gears to said shaft; control means for shifting said clutch element comprising a tubular shaft turnable in either one of opposite directions and extending from said drive establishing mechanism, connecting means between said tubular shaft and said clutch element, and a manually operable steering wheel free of but connectable to said tubular shaft for effecting turning of said tubular shaft; means for optionally enabling manual steering of said steerable steering mechanism including a turnable shaft extending through said tubular shaft and connected to said steering mechanism, said steering wheel being also free of but connectable to said turnable shaft; and means for selectively connecting said steering wheel to said turnable shaft or to said tubular shaft.

CARL A. GUSTAFSON.